Dec. 6, 1938.    J. KIRGAN    2,139,505
DAMPER
Filed Aug. 6, 1937
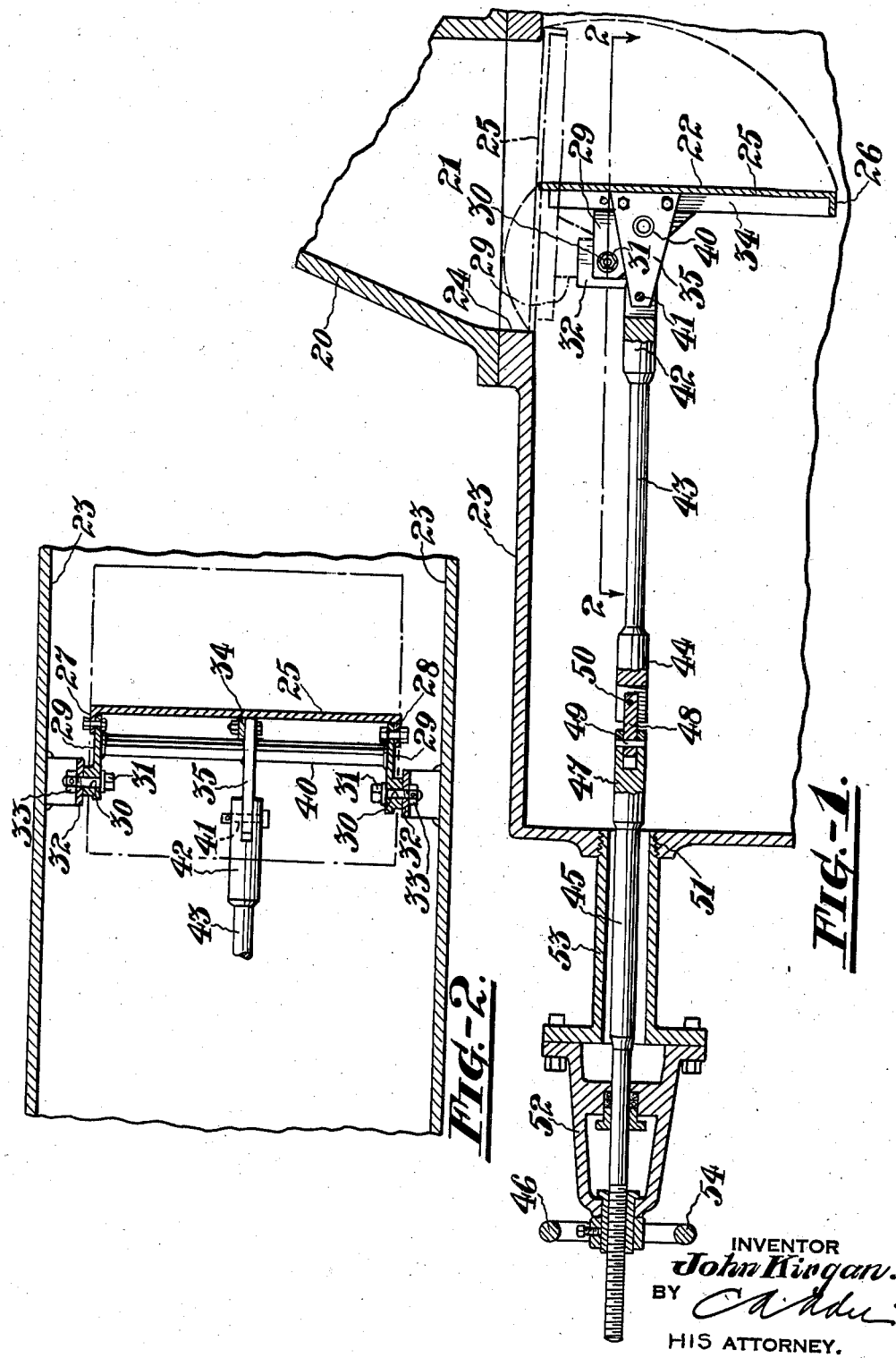
INVENTOR
John Kirgan.
BY
HIS ATTORNEY.

Patented Dec. 6, 1938

2,139,505

UNITED STATES PATENT OFFICE 2,139,505

DAMPER

John Kirgan, Easton, Pa., assignor to Ingersoll-Rand Company, Jersey City, N. J., a corporation of New Jersey Application August 6, 1937, Serial No. 157,677

1 Claim. (Cl. 251—17)

This invention relates to valving devices, but more particularly to a damper for controlling the flow of fluid through a port such as the inlet of a compressor or the like.

An object of the invention is to obviate obstruction of the inlet port.

Another object of the invention is to obviate undue changes in the direction of fluid flow to the inlet port when the position of the damper is changed.

A further object is to assure longevity of the damper structure by avoiding a multiplicity of relatively movable parts.

Other objects will be in part obvious and in part pointed out hereinafter.

In the drawing which accompanies this specification,

Figure 1 is a longitudinal elevation, partly broken away, of a compressor equipped with a damper constructed in accordance with the practice of the invention, and Figure 2 is a sectional view taken on the line 2—2 of Figure 1.

Referring more particularly to the drawing, 20 designates a conduit, for example a part of the casing of a compressor, the inlet port or opening 21 of which is to be controlled by a damper 22.

For the purpose of illustration, the damper is described herein as applied to the centrifugal vapor compressor of a water-vapor refrigerating apparatus, 23 designating the evaporator vessel thereof and 24 indicating the vapor outlet to which the inlet 21 of the compressor 20 is connected.

In apparatus of this character, water or other liquid enters the vessel 23 and is cooled by partial vaporization under the action of a vacuum maintained in the vessel by the compressor. The vacuum is of a very high degree and consequently the vessel is tightly sealed and access to the interior thereof or to the inlet of the compressor is not easily obtained once the compressor is fixed in its position.

The vapor of the refrigerant, held in considerable volume in the vessel 23, flows in various directions through the vessel and enters the port 21 from the opposite side of the port and is drawn off by the compressor. At times, however, the flow of vapor must be reduced, for example in order to maintain stable load on the compressor or to prevent freezing of the refrigerant in the vessel 23. Such a condition may occur at low refrigerating loads and may be overcome by preventing the compressor from decreasing the pressure in the vessel, as for example by closing the damper 22.

The damper 22 is of simple construction involving very few movable parts and is preferably so designed that movement of a rod extending through a wall of the vessel 23 will change the angular position of the damper with respect to the port 24 to open and close the port without causing any material change in the direction of vapor flow to the port as it enters the port from the opposite sides thereof.

In the illustrated construction, a closure member or plate 25 of roughly the same shape and area as the compressor inlet opening 21 (as shown in dot and dash lines in Figure 2), is flanged at the edges as indicated by 26, 27 and 28 to give it strength, and to each of the opposite side flanges 27 and 28 is fastened an arm 29. These arms are preferably each journalled, as at 30, to receive the shaft of a pin or bolt 31 which extends through the arm and through a support member or bracket 32, the brackets being affixed to opposite side walls of the vessel 23. Nuts 33 or other suitable means are fixed in a desired position on the bolts 31, for example by cotter pins (not shown), to hold the parts in assembled position.

The bolts 31 are axially aligned to serve as an axis about which the plate 25 may rotate. The axis of the bolts 31 is preferably off-center with respect to the damper plate 25 and is nearest that end of the plate which will be nearest the port 24 when the damper is in open position (upper end in the position shown). In this way the plate 25 is prevented from deeply penetrating the inlet 21 when it is rotated, is quickly opened from a closed position, and when fully open assumes a position substantially perpendicular to the plane of the port 24, preferably central with respect to the port and completely clear of the port.

It will thus be seen that with the plate mounted on the bolts in this manner the vapor may flow to the port from both sides of the plate without suffering any material change of direction as the plate swings from one angular position to another with respect to the port.

Suitable connections between the plate 25 and the exterior of the vessel 23 serve to effect rotation of the plate about the axis of the bolts 31. In the illustrated construction, a lever bar 35 is affixed to the plate 25 and has its free end pinned by suitable means, as at 41, to the bifurcated part of a clevis 42. The free end of the clevis 42 is in turn affixed to one end of a rod 43 and the other end of this rod is affixed to another clevis 44 which in turn is connected by suitable means to a movable lever 45 of the actuating mechanism 46.

In the illustrated construction, the lever 45 has a reciprocating motion, and the connection between the clevis 44 and the lever 45 is preferably of the universal type so that the rod 43 may swing in any direction without causing the actuating lever 45 to bend or otherwise materially change its axial position.

As shown, this joint consists of two clevises 44 and 47 on the ends of rod 43 and lever 45, respectively, and having their bifurcated portions at right angles with respect to each other. A bar 48 extends into both of these bifurcations to connect the clevises 44 and 47 and is pinned at 49 and 50 by suitable means to the clevises 44 and 47, respectively. Thus the clevis 44 may rotate alone about pin 50, which is positioned parallel to the axis of the bolts 31, or the clevis 44 together with the bar 48 may rotate about pin 49. During movement of the damper the amount of rotation of the lever 45 about the pin 49 and of the rod 43 about the pin 50 will be of negligible amounts.

The lever 45 extends outside of the vessel 23 through an opening 51 in a side wall thereof and enters the superstructure or bonnet 52 of a conventional rising-stem gate-valve, such a structure serving as a convenient means for causing reciprocatory movement of the stem or lever 45. A sleeve 53 surrounds the lever 45 and serves to connect the bonnet 52 to the vessel 23, the sleeve being threaded into the opening 51 to seal the same.

Seals around the lever 45 are maintained in the bonnet 52 in the customary manner, and a suitable gasket (not shown) may be used to seal the connection between the bonnet and the sleeve 53. The usual hand-wheel 54, outside the vessel 23, serves to effect reciprocation of the lever 45 for moving the rod 43 and altering the position of the damper plate 25.

If desired, the plate 25 may be strengthened, as for example by a rib 34 parallel to the flanges 27 and 28, and by a bar 40 affixed to the arms 29 and lever bar 35.

In operation, the damper 25 will close the inlet opening 21 (as shown in dot and dash lines in Figure 1) when the lever 45 is moved deepest into the evaporator 23. In this position the plate 25 overlies the port 24.

When the lever 45 is drawn out of the vessel 23 by rotation of the wheel 54, the damper will swing away from the opening 21 (as indicated in dash lines in Figure 1), change its angular position with respect to the port 24 until it assumes a position substantially perpendicular to the plane of the port 24 as shown in Figure 1. In this position, the plate 25 defines passages into the port 24. The total area of these passages is substantially the same as the area of the port, and the resistance of the plate 25 to the flow of vapor to the opposite sides of the port is minimized because there is relatively little obstruction of the port and the vapor will flow substantially tangential to the plate.

When the damper plate 25 is rotated to positions partially closing the port 24, both sides of the port are simultaneously closed in the same amount, and in such positions the vapor continues to flow in substantially its normal paths to the port, thus obviating the additional resistance to flow which would be encountered if the vapor were forced to flow around the plate 25 to reach the port.

I claim:

In a device for controlling the flow of fluid comprising walls defining a port, a pivotal mounting exterior of the port, a port damper plate pivotally supported on said pivotal mounting and movable within the planes of said walls to simultaneously open the port on opposite sides of the damper plate, and means to move the damper plate from a position closing the port to a position exterior of the port and substantially perpendicular to the closing position to open the port comprising a lever bar extending from said plate, a rod, a clevis on the rod pivotally secured to the lever bar, a second clevis having a bifurcated portion on the rod, a lever longitudinally movable along its axis and having its axis substantially parallel to the damper plate in its closing position, a third clevis on said movable rod having its bifurcated portion arranged at right angles to the bifurcated portion of said second clevis, a bar extending into and pivotally secured to the second and third clevises to provide a universal joint between said rod and said movable lever, threads on the longitudinally movable lever, a rotatable handle having threads cooperated with said threads to move said movable lever longitudinally upon rotation, and a guide bushing for said handle to prevent longitudinal movement of the handle along the movable lever.

JOHN KIRGAN.